US009470198B2

(12) United States Patent
Koch et al.

(10) Patent No.: US 9,470,198 B2
(45) Date of Patent: Oct. 18, 2016

(54) VALVE FOR METERING FLUID

(71) Applicant: ROBERT BOSCH GMBH, Stuttgart (DE)

(72) Inventors: Thomas Koch, Weiβwasser (DE); Dietmar Schmieder, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 55 days.

(21) Appl. No.: 14/381,005

(22) PCT Filed: Jan. 25, 2013

(86) PCT No.: PCT/EP2013/051458
§ 371 (c)(1),
(2) Date: Aug. 26, 2014

(87) PCT Pub. No.: WO2013/127580
PCT Pub. Date: Sep. 6, 2013

(65) Prior Publication Data

US 2015/0014436 A1 Jan. 15, 2015

(30) Foreign Application Priority Data

Feb. 27, 2012 (DE) ........................ 10 2012 202 909

(51) Int. Cl.
*F02M 61/10* (2006.01)
*F16K 31/10* (2006.01)
*F02M 63/00* (2006.01)
(Continued)

(52) U.S. Cl.
CPC ......... *F02M 63/0026* (2013.01); *F02M 61/08* (2013.01); *F02M 61/167* (2013.01); *F02M 2200/705* (2013.01); *F02M 2200/707* (2013.01)

(58) Field of Classification Search
CPC ............... F02M 61/08; F02M 61/167; F02M 63/0026; F02M 2200/705; F02M 2200/70; F16K 31/007
See application file for complete search history.

(56) References Cited

U.S. PATENT DOCUMENTS

| | | | | |
|---|---|---|---|---|
| 7,066,399 B2 * | 6/2006 | Hohl | F02M 51/0603 239/102.2 |
| 7,500,648 B2 * | 3/2009 | Kammerer | F02M 51/0603 251/51 |
| 2006/0043213 A1 * | 3/2006 | Gerschwitz | F02M 51/0603 239/102.2 |

FOREIGN PATENT DOCUMENTS

| | | | | |
|---|---|---|---|---|
| DE | 10148594 A1 * | 4/2003 | F02M 51/0603 |
| DE | EP 1526275 A1 * | 4/2005 | F02M 51/0603 |
| DE | EP 1538331 A1 * | 6/2005 | F02N 51/0603 |

(Continued)

*Primary Examiner* — Marina Tietjen
*Assistant Examiner* — Seth W MacKay-Smith
(74) *Attorney, Agent, or Firm* — Norton Rose Fulbright US LLP

(57) ABSTRACT

A valve for metering fluid having a valve assembly which meters the fluid, and a hydraulic coupler assigned to the valve assembly. The coupler has a housing cup having a cup bottom, cup wall and cup opening; a piston is guided inside the housing cup in axially displaceable manner and delimits a fluid-filled coupler gap in the direction of the cup bottom and delimits an annular gap in the direction of the cup wall; and a cap-shaped diaphragm having a cap bottom and cap shell, which covers the annular gap at the cup opening by the cap bottom and overlaps the cup wall of the housing cup by the cap shell, and is fixed in place at the piston and cup wall in fluid-tight manner.

14 Claims, 4 Drawing Sheets

(51) Int. Cl.
*F02M 61/08* (2006.01)
*F02M 61/16* (2006.01)

(56) References Cited

FOREIGN PATENT DOCUMENTS

| | | | | | |
|---|---|---|---|---|---|
| DE | 10 2004 002081 | | | 8/2005 | |
| DE | 10 2004 002134 | | | 8/2005 | |
| DE | 102004002081 | A1 | * | 8/2005 | ......... F02M 51/0603 |
| DE | EP 1593841 | A1 | * | 11/2005 | ......... F02M 51/0603 |
| DE | EP 2199591 | A1 | * | 6/2010 | ......... F02M 51/0603 |
| DE | 102009026532 | A1 | * | 12/2010 | ......... F02M 51/0603 |
| EP | 2 199 591 | | | 6/2010 | |
| JP | 2000329028 | A | | 11/2000 | |
| JP | 2005516155 | A | | 6/2005 | |

* cited by examiner

VALVE FOR METERING FLUID

FIELD OF THE INVENTION

The present invention is based on a valve for metering fluid, the umbrella term 'fluid' for a liquid or flowing medium being used for gases and liquids in conformity with the teachings of hydrodynamics.

BACKGROUND INFORMATION

One fuel injector (DE 10 2004 002 134 A1) has a hydraulic coupler, which is situated in a valve assembly that is accommodated in a valve housing; the valve assembly is made up of a valve needle controlling an injection orifice and a piezoelectric or magnetostrictive actuator actuating the valve needle, the coupler being supported in force-locking manner on the valve needle and actuator via a separate gimbal bearing in each case. The hydraulic coupler compensates for length differences resulting from different expansions of the valve housing or valve needle and actuator caused by temperature fluctuations, so that no gap can form between valve needle and actuator and it is ensured that the full lift of the actuator is transmitted to the valve needle in a 1:1 manner at all times. The hydraulic coupler has a housing cup including a cup bottom, a cup shell, and a cup opening as well as a piston which is guided in the housing cup in axially displaceable manner; a fluid-filled coupler gap exists between the piston and cup bottom, and an annular gap exists between the piston and cup shell. An annular first diaphragm is fixed in place on the cup shell via its outer diaphragm edge, and on the piston via its inner diaphragm edge; it seals the annular gap between the cup shell and piston in the cup opening while encompassing a first fluid-filled compensating chamber. A second diaphragm, situated on a side of the cup bottom facing away from the piston, together with the housing cup surrounds a fluid-filled second compensating chamber, which is connected to the coupler gap on one side by way of a throttle bore, and to the first compensating chamber on the other side by way of a connecting channel which axially runs through the piston. The coupler gap and the compensating chambers are filled with fluid, e.g., hydraulic oil, via a hermetically sealable fill channel, which, for example, is realized by a radial bore that is introduced in the cup shell and discharges into the connecting channel between the first and second compensating chamber.

SUMMARY OF THE INVENTION

The metering valve according to the present invention having the features described herein has the advantage that the cap shell of the diaphragm, which covers the cup wall at least partially, is able to deform under pressure due to its elastic deformation regions, so that the compensating chamber enclosed between diaphragm and housing cup has a sufficiently large volume to accommodate the coupler fluid expelled from the coupler gap when the piston is under compressive load. When the pressure on the piston is relieved, the pressure force generated by the elastically deformed cap shell of the diaphragm is sufficiently high to push the fluid volume stored in the compensating chamber back into the coupler gap via the annular gap, and to enlarge the coupler gap again.

According to one advantageous specific embodiment of the present invention, the elastic deformation regions are formed by radially inwardly pointing and axially extending indentations that follow one another in the peripheral direction, which makes it possible to realize the elastic deformation regions having the sufficiently large compensation volume in a simple manner in terms of production technology.

In contrast to the initially described coupler in the known fuel injector, the larger compensating volume between the diaphragm and housing cup that is available because of the elastic deformation regions in the cap shell therefore makes it possible to dispense with a second diaphragm usually made of steel and having a second compensating chamber between the cup bottom and second diaphragm, which manifests itself in considerable cost savings in the manufacture of the metering valve. The omission of a second diaphragm at the cup bottom of the housing cup furthermore provides additional constructive options for technical improvements and simplifications of the valve.

For example, according to one advantageous specific embodiment of the present invention, the fill port required to fill the coupler gap with fluid, e.g., hydraulic oil, is able to be provided as a simple axial bore in the cup bottom of the housing cup, which may be in the form of a stepped bore. After the coupler gap has been filled, the fill port may be securely sealed by pressing a seal into the axial bore, which may be into the bore section of the stepped bore that has a larger diameter.

In addition, according to one advantageous specific embodiment of the present invention, a gimbal-mounted support of the coupler may be implemented between a valve assembly and a housing component, or between two components of the valve assembly, directly at the cup bottom of the housing cup, which considerably simplifies the constructional and manufacture-related development of the bearing.

Toward this end, according to one advantageous specific embodiment of the present invention, the housing cup is accommodated in a cavity at the end face, in a connecting piece that seals the valve housing, and supported on the connecting piece by way of a gimbal bearing which is formed between the cup bottom and the bottom of the recess, while the piston is rigidly connected to the valve assembly.

According to one advantageous development of the present invention, in which the coupler is situated within the valve assembly and supported on a component of the valve assembly via a separate gimbal bearing in each case, the housing cup is braced on the actuator by way of a first gimbal bearing formed between the cup bottom and an actuator, said actuator embodying the one component, and the piston is braced by way of a second gimbal bearing on a valve needle, which embodies the other component. Placing the coupler between the two components of the valve assembly, more specifically, between the valve needle and the actuator which is actuating the valve needle, has the further advantage that the electrical connections of the actuator leading to an electrical plug implemented on the valve housing in the region of the connecting piece, need not be routed across the coupler. This makes it possible to enlarge the outer diameter of the coupler, and to thereby achieve a significant further improvement in the volume change by way of pressure via the cap shell of the diaphragm.

Because a second diaphragm spanning the cup bottom is dispensed with, in one advantageous development of the present invention it is possible to connect the housing cup rigidly to a connecting piece which seals the valve housing, or which may form it in one piece together with the connecting piece, which results in a simplification of the valve assembly in terms of production technology. In this case, the piston is braced on the valve assembly via a gimbal bearing.

The present invention is explained in greater detail in the following description on the basis of exemplary embodiments illustrated in the drawing.

DETAILED DESCRIPTION

Figure 1:
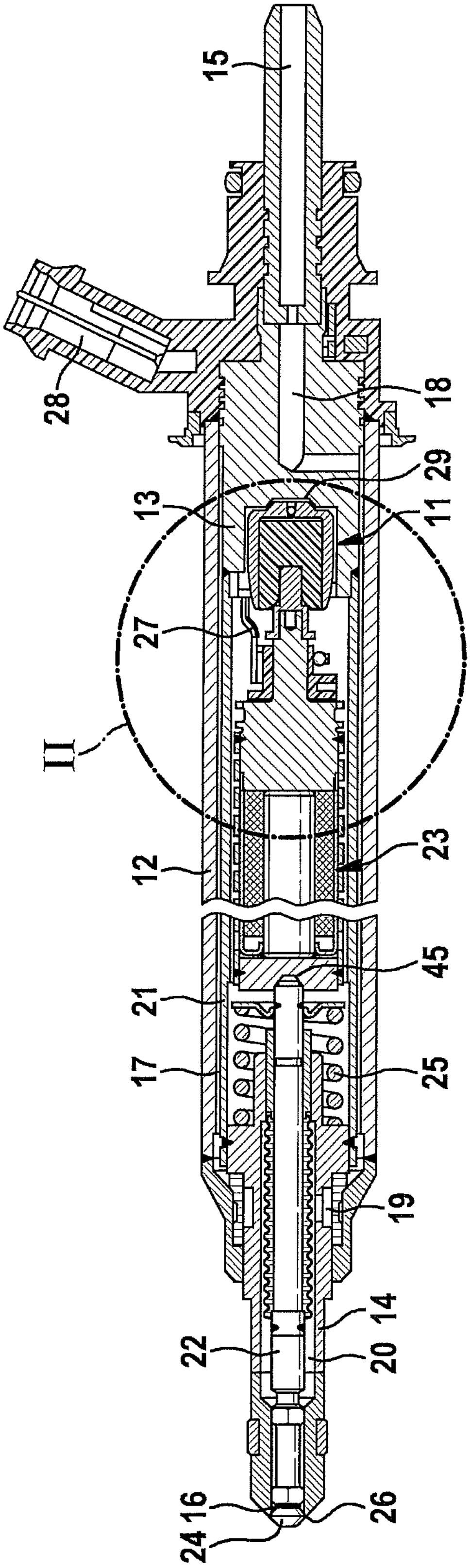
FIG. 1 shows a longitudinal section of a valve for metering fluid.

The valve for metering fluid, shown as longitudinal section in FIG. 1, is used, for example, as an injection valve for the injection of fuel in a fuel-injection system of internal combustion engines. The valve includes a valve assembly that meters the fluid, and a hydraulic coupler 11 assigned to the assembly. Valve assembly and hydraulic coupler 11 are situated inside a valve housing 12, which is sealed at one end face by a connecting piece 13, and at the other end face by a valve body 14, in fluid-tight manner in each case. Connecting piece 13 is provided with an intake 15 for the fluid, and valve body 14 is provided with a metering orifice 16 for the fluid. A hollow-cylindrical flow channel 17 runs from intake 15 to metering orifice 16 and is connected to intake 15 via at least one bore 18 introduced in connecting piece 13, and to a valve chamber 20 upstream from metering orifice 16 via a radial bore 19 introduced in valve body 14. On the outside, flow channel 17 is delimited by valve housing 12, and on the inside, by a sleeve 21, which is fixed in place at connecting piece 13 on one side, and on valve body 14 on the other side, in fluid-tight manner in each case. The valve assembly has a valve needle 22 for controlling metering orifice 16, and a piezoelectric or magnetostrictive actuator 23 for actuating valve needle 22. To open and close metering orifice 16, valve needle 22 has a closing head 24, which is pressed onto a valve seat 26 surrounding metering orifice 16 under the action of a valve-closure spring 25, which engages at valve needle 22 and is braced on valve body 14. When a current is supplied, actuator 23 displaces valve needle 22 counter to the force of valve-closure spring 25, so that closing head 24 lifts off from valve seat 26 in the outward direction and releases metering orifice 16. For the current supply, actuator 23 is connected via a contact bridge 27 to a connection plug 28 which is integrally formed on valve housing 12. Valve-closure spring 25, actuator 23, and hydraulic coupler 11 are situated inside sleeve 21. In the exemplary embodiment shown, coupler 11 is clamped between the valve assembly and connecting piece 13 in force-locking manner, actuator 23 is fixed in place via a gimbal bearing 45 on the end of valve needle 22 remote from the closing head, and coupler 11 is fixed in place on connecting piece 13 via a gimbal bearing 29.

Figure 2:
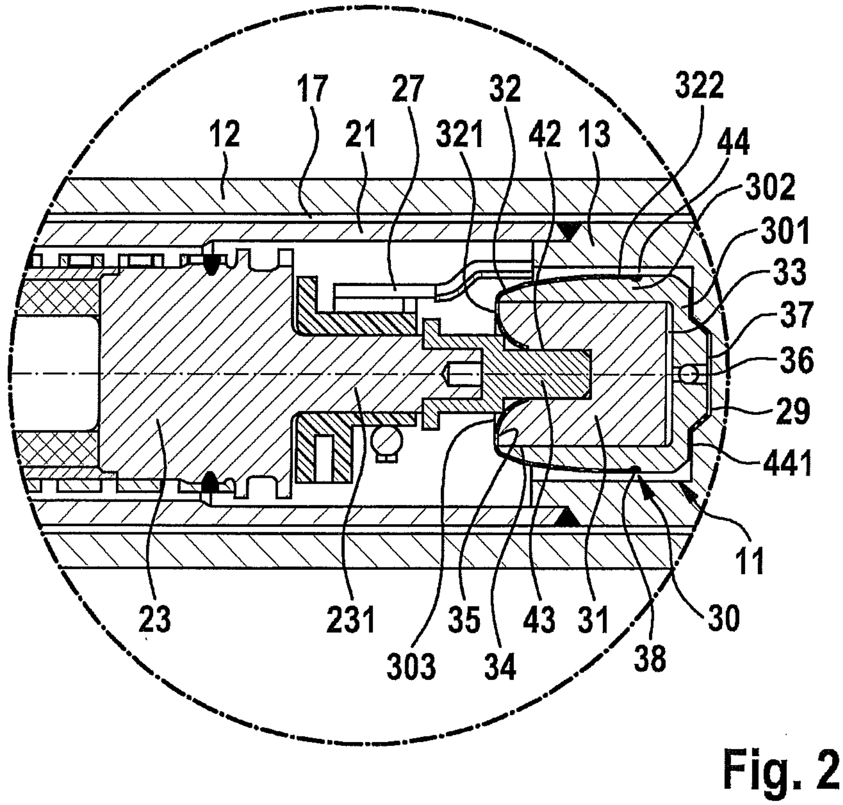
FIG. 2 shows an enlarged view of cutaway II in FIG. 1.

Hydraulic coupler 11, which is shown in enlarged form in FIG. 2, has a housing cup 30 including a cup bottom 301, a cup wall 302, and a cup opening 303, a piston 31, and a cap-shaped diaphragm 32 which includes a cap bottom 321 and cap shell 322. Piston 31 is guided in axially displaceable manner in housing cup 30 and delimits a coupler gap 33, filled with a fluid such as hydraulic oil, with respect to cup bottom 301;

it also delimits an annular gap 34 with respect to cup wall 302. Cup bottom 321 of diaphragm 32 covers annular gap 34 at cup opening 303 and overlaps cup wall 302 of housing cup 30 by its cup shell 322, and is fixed in place at piston 31 and cup wall 302 in fluid-tight manner in each case. This produces a compensating chamber 35 between diaphragm 32 on the one side and piston 31 and housing cup 30 on the other, which compensating chamber is connected to coupler gap 33 via annular gap 34. Coupler gap 33 and compensating chamber 35 are filled with fluid, i.e., the so-called coupler fluid, such as hydraulic oil, via a fill port 36 which is implemented in cup bottom 301 of housing cup 30 and realized in the form of an axial stepped bore, whose bore section having the smaller diameter discharges into coupler gap 33, and whose bore section having the larger diameter accommodates a sealing plug 37. As can be gathered from FIG. 2, cup shell 322, which overlaps cup wall 302, extends across more than half the axial length of cup wall 302 of housing cup 30, and is fixed in place on cup wall 302 at or near its shell edge, in this case, by a circumferential welding seam 38.

Figure 3:
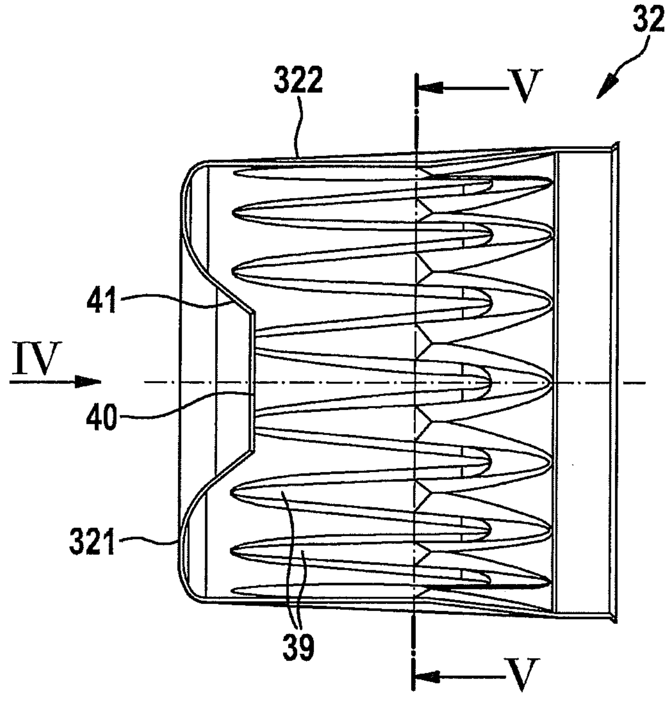
FIG. 3 shows a side view of a diaphragm of a coupler in the metering valve according to FIG. 1.
Figure 4:
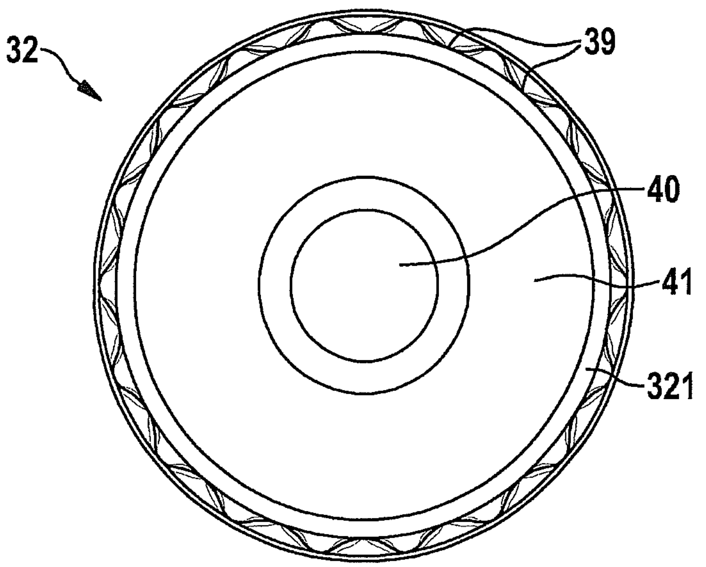
FIG. 4 shows a front-side view of the diaphragm in direction IV in FIG. 3.
Figure 5:
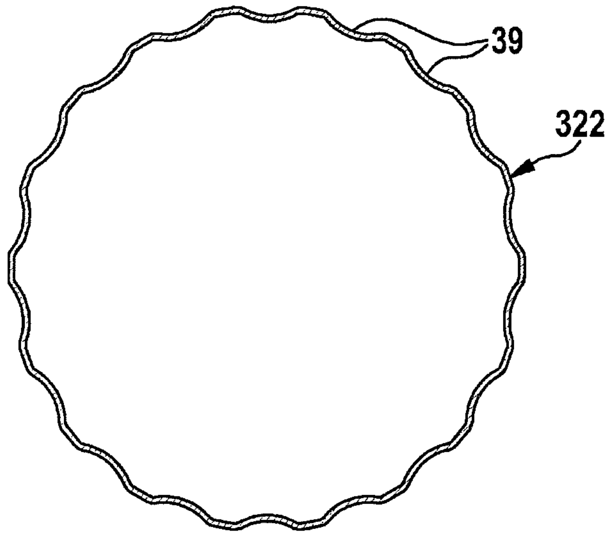
FIG. 5 shows a section of the diaphragm along line V-V in FIG. 3.

FIGS. 3, 4 and 5 show cap-shaped diaphragm 32 in a side view, a front view and as a section. Cap shell 322 does not have a smooth surface, but includes elastic deformation regions which are realized by consecutive, radially inwardly directed and axially extending indentations 39. If diaphragm 32 is made of steel in the usual manner, indentations 39 are impressed in cap shell 322. However, diaphragm 32 may also be made from an elastomer, in which case indentations 39 are integrally formed during the production.

Cap bottom 321 of diaphragm 32 has a central opening 40 and a funnel-shaped bottom region 41 which encloses opening 40 and projects into the cap interior (FIGS. 3 and 4). To affix cap bottom 321 on the end face of piston 31 facing away from coupler gap 33, funnel-shaped bottom region 41 dips into a central recess (42) formed in piston 31 (FIG. 2) and is fixedly joined to piston 31 with the aid of a bolt 43, which is press-fit in recess 42. As an alternative or in addition, bottom region 41 may also be welded to piston 31 inside recess 42.

Housing cup 20 is accommodated with play in a cavity 44, which is present in connecting piece 13 and is open toward the front end; it is braced on connecting piece 13 via gimbal bearing 29 embodied between cup bottom 301 and cavity bottom 441. Piston 31 is rigidly joined to actuator 23, which is provided with an axially projecting lug 231 for this purpose, which is press-fit in a front-side depression of bolt 43 projecting from recess 42.

If a change in temperature causes different expansions of actuator 23 or valve housing 12, in which actuator 23 and valve housing 12 expand to different degrees, then the pressure of piston 31 on coupler gap 33 increases. The increased pressure in coupler gap 33 causes the coupler fluid to be expelled from coupler gap 33, and to be introduced via annular gap 34 into compensating chamber 35 sealed by diaphragm 32. Under the pressure of the displaced fluid, indentations 39 in cap shell 322 of diaphragm 32 deform to such an extent that the fluid displaced from coupler gap 33 is completely absorbed into compensating chamber 35. If the piston pressure on coupler gap 33 increases again due to the temperature change, deformed indentations 39 of cap shell 322 generate sufficient pressure force to press the fluid from compensating chamber 35 back into coupler gap 33 again, via annular gap 34, while simultaneously displacing piston 31.

Figure 6:
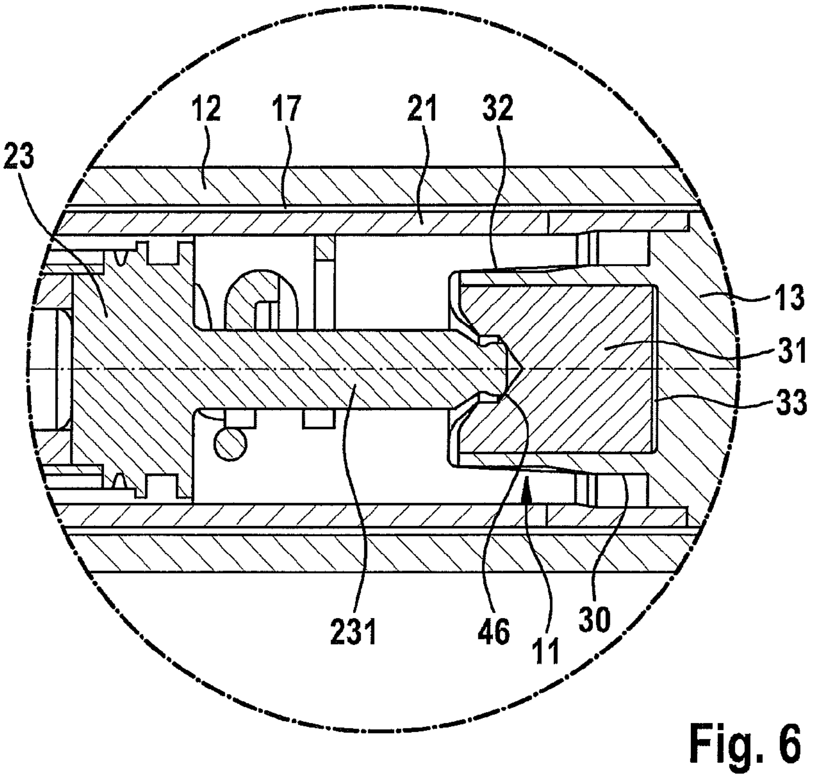
FIG. 6 shows an identical representation as in FIG. 2, showing a modified hydraulic coupler.

The valve, shown in a part-sectional view as a further exemplary embodiment in FIG. 6, has been modified in comparison with the afore-described valve, insofar as housing cup 30 is integrally formed with connecting piece 13, so that the cup bottom of housing cup 30 is formed by connecting piece 13, and coupler gap 33 is delimited by piston 31 and connecting piece 13. The gimbal bearing at the cup bottom has been omitted and replaced by a gimbal bearing 46 between lug 231 of actuator 23 and piston 31, for which purpose lug 231 dips into recess 42 in piston 31 via a rounded head, where it supports itself in force-locking manner.

Figure 7:
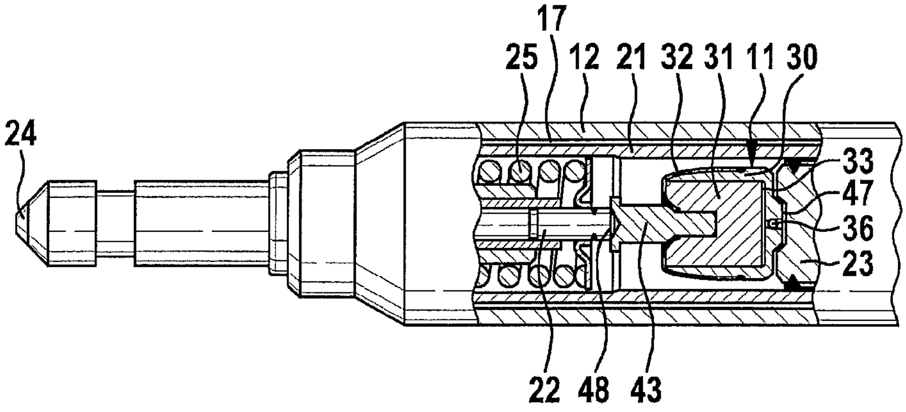
FIG. 7 shows in a cutaway representation, a side view of a metering valve according to a second exemplary embodiment, partially cut.

The valve partially shown in FIG. 7 is modified insofar as hydraulic coupler 11 is frictionally clamped within the valve assembly, i.e., between valve needle 22 and actuator 23. Via a gimbal bearing 47 formed between its cup bottom 301 and actuator 23, housing cup 30 is braced on actuator 23, and via a gimbal bearing 48 formed between bolt 43 and the end of valve needle 22 remote from the closing head, it is braced on valve needle 22. In contrast to the placement of hydraulic coupler 11 between the valve assembly and connecting piece 13 according to FIG. 1, the placement of hydraulic coupler 11 within the valve assembly according to FIG. 7 has the advantage that contact bridge 27 from connector plug 28 to actuator 23 need not be routed across hydraulic coupler 11. The diameter of hydraulic coupler 11 thus is able to have considerably larger dimensions. Furthermore, the valve shown in FIG. 7 is identical with the valve shown in FIGS. 1 and 2, so that identical components have been provided with identical reference numerals.

What is claimed is:

1. A valve for metering fluid, comprising:

a valve assembly to meter the fluid;

a hydraulic coupler assigned to the valve assembly, the coupler having a housing cup including a cup bottom, a cup wall and a cup opening, a piston, which is guided in the housing cup so as to be axially displaceable and which delimits a fluid-filled coupler gap by the cup bottom, and which delimits an annular gap by the cup wall, and having a cap-shaped diaphragm having a cap bottom and a cap shell, which covers the annular gap by the cap bottom at the cup opening, and overlaps the cup wall of the housing cup by the cap shell, and which is fixed in place in fluid-tight manner at the piston and the cup wall, wherein the cap shell includes elastic deformation regions, wherein the elastic deformation regions are formed by indentations which follow one another in the circumferential direction, point radially to the inside and extend in the axial direction.

2. The valve of claim 1, wherein the diaphragm is made of steel, and the indentations are impressed in the cap shell.

3. The valve of claim 1, wherein the cap shell extends across more than half the axial length of the cup wall of the housing cup.

4. The valve of claim 1, wherein the affixation of the diaphragm on the cup wall of the housing cup is implemented on or near the shell edge of the cap shell, by welding.

5. The valve of claim 1, wherein the cap bottom has a central opening and a funnel-shaped bottom region which encloses the opening and projects into the cap interior, wherein the piston has a central recess which is introduced in the end face, and wherein the affixation the diaphragm on the piston is implemented by fixing the bottom area in place in the recess, by welding.

6. The valve of claim 5, wherein there is a fill port for the fluid, which discharges in the coupler gap, in the cup bottom, which port is able to be sealed in fluid-tight manner.

7. The valve of claim 1, wherein the valve assembly and the coupler are disposed in a valve housing, and wherein the coupler is clamped in force-locking manner between the valve assembly and a connecting piece which seals the valve housing.

8. The valve of claim 7, wherein the housing cup is accommodated in the connecting piece in a cavity that is open on the end face, and is braced on the connecting piece via a gimbal bearing embodied between the cup bottom and the cavity bottom, and the piston is rigidly connected to the valve assembly.

9. The valve of claim 8, wherein the valve assembly has a valve needle and a piezoelectric or magnetostrictive actuator which actuates the valve needle, and the actuator is braced on the valve needle via a gimbal bearing and is rigidly connected to the piston of the coupler.

10. The valve of claim 7, wherein the housing cup is firmly connected, in integral fashion, to the connecting piece, and the piston is braced on the valve assembly via a gimbal bearing.

11. The valve of claim 10, wherein the valve assembly has a valve needle and a piezoelectric or magnetostrictive actuator which actuates the valve needle, and the actuator is braced on the valve needle via a first gimbal bearing and is braced on the piston via a second gimbal bearing.

12. The valve of claim 11, wherein the actuator has a lug which dips into the recess of the piston, and the second gimbal bearing is formed between the lug and the recess.

13. The valve of claim 12, wherein the coupler is clamped in the valve assembly and braced on a component of the valve assembly via a separate gimbal bearing in each case.

14. The valve of claim 13, wherein the valve assembly has a valve needle, a piezoelectric or magnetostrictive actuator which actuates the valve needle, and the housing cup is braced on the actuator via a first gimbal bearing formed between the cup bottom and the actuator, and the piston is braced on the valve needle via a second gimbal bearing.

* * * * *